Jan. 7, 1969  M. P. SCHLIENGER  3,420,939
ARC FURNACE ELECTRODE STRUCTURE
Filed Jan. 4, 1968
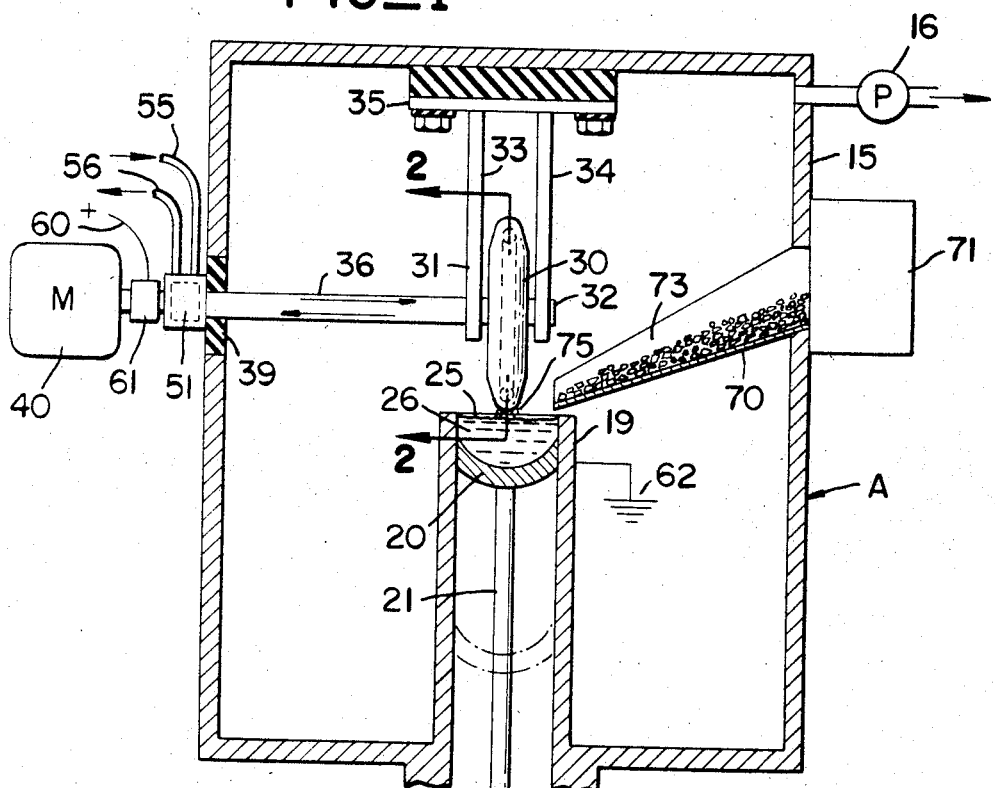
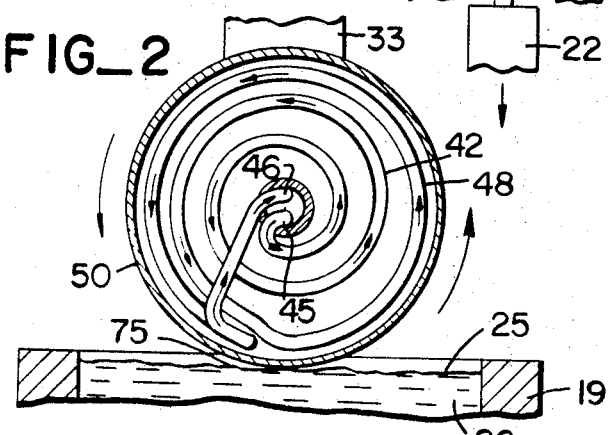
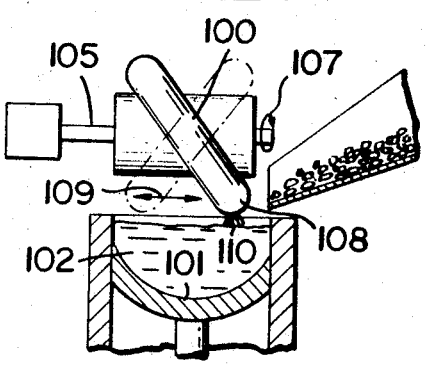
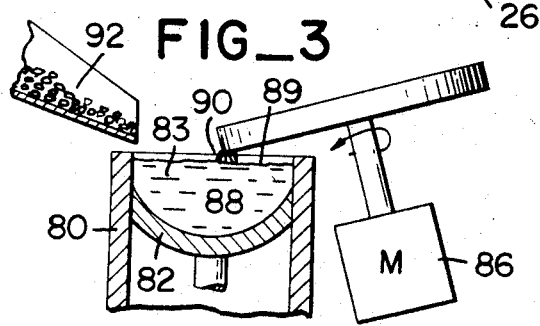
INVENTOR.
MAX P. SCHLIENGER
BY
Townsend and Townsend
ATTORNEYS ns.patent-logo-removed

United States Patent Office 3,420,939
Patented Jan. 7, 1969

3,420,939
ARC FURNACE ELECTRODE STRUCTURE
Max P. Schlienger, 19 Rollingwood Drive,
San Rafael, Calif. 94901
Filed Jan. 4, 1968, Ser. No. 695,937
U.S. Cl. 13—18
Int. Cl. H05b 7/06; H05b 7/18; B23k 9/16
9 Claims

ABSTRACT OF THE DISCLOSURE

A nonconsumable arc furnace electrode in which the electrode is formed of a cooled wheel-like member which is rotated to sequentially expose portions of the periphery of the wheel-like electrode in arc forming contact with the work piece.

---

This invention relates to a nonconsumable electrode mechanism for arc furnaces.

Arc furnaces generally incorporate a melt and an electrode which is arranged to establish an arc to the melt in order to create a sufficient temperature gradient to melt materials within an evacuated atmosphere. One commonly employed technique utilizes a previously molded, consumable electrode in which the electrode itself constitutes the material which is to be melted. This technique, however, requires that the work material be previously formed in an electrode shape. In other applications where powder or sponge material is to be melted, a nonconsumable electrode must be employed to create the requisite arcs. Such nonconsumable electrodes when appropriately cooled can function to provide the arc which maintains the melt at a sufficient temperature gradient to melt the powder or granular materials being added to the melt. However, the heat at the electrode tip causes severe erosion of the tip which in the case of higher temperature applications renders such a technique difficult, if not for all intents and purposes impossible. This is particularly true where refractory and reactive metals such as columbium, molybdenum, tungsten, zirconium and titanium are to be treated.

The present invention is concerned with providing a novel electrode configuration which has a changing surface arc-forming area exposed to the melt so that cooling which is applied in association with the entire surface area can function to maintain the electrode at a sufficiently low temperature gradient to allow high temperature arc-melting functions to occur without electrode destruction.

A further object of this invention is to provide an electrode formed of a wheel having internal water cooling which is maintained so that the arc forms from a tangential portion of the wheel to the melt or work piece in which the wheel is rotated so that the combination of a large surface area electrode for cooling purposes can be combined with a small arc-forming area.

A feature and advantage of this invention is that each portion of the tangential portion of the electrode is only in arc-forming contact with the melt for a short interval while at the same time a continuous arc is maintained.

Other objects, features and advantages of the present invention will be more apparent after referring to the following specification and accompanying drawings in which:

FIG. 1 is a diagrammatic view showing an arc furnace incorporating a principal embodiment of the present invention;

FIG. 2 is a cross-sectional view of the electrode taken at line 2—2 of FIG. 1;

FIG. 3 is an elevational view of another embodiment of the present invention; and FIG. 4 is a diagrammatic view of still another embodiment of the present invention.

Referring now to the drawings, in reference to FIGS. 1 and 2, there is provided an arc furnace A formed with an enclosure or housing 15 and having an evacuation pump mechanism 16 adapted to withdraw gas from the housing. By this means the interior of housing 15 can be maintained under high vacuum conditions, the exact pressure of which is determined by the materials to be worked on and the proposed purpose for their treatment. However, if desired, the melt can also be accomplished under pressure of suitable inert gases or mixtures. This is sometimes required to prevent evaporation of materials or alloy while being melted.

A cylinder 19 is vertically mounted in the interior of housing 15 in which a crucible 20 is reciprocally mounted within the cylinder. The crucible is supported by a shaft 21 and is drawn downwardly by a propulsion device 22 on demand. Thus, the upper surface 25 of melt 26 within crucible 20 can be maintained at a desired level simply by raising and lowering crucible 20 by the power device 22. As additional materials are fed to melt 26 the crucible 20 is accordingly lowered, thereby holding the upper surface 25 of melt 26 in its requisite position. The aforesaid melt-forming structure is common in the art and is illustrated in the present form for illustrative purposes only, it being understood that the invention can be combined with other forms of work supporting devices.

The electrode of the present invention is mounted above melt 26 and primarily includes an electrode wheel 30. The wheel is pivotally mounted by bearings 31 and 32 carried by depending arms 33 and 34 respectively. The arms 33 and 34 are mounted to housing 15 by electrically insulated supports 35 thereby holding the bearings 31 and 32 in electrical isolation from housing 15. Electrode wheel 30 is mounted on a shaft 36 which is supported by the bearings 31 and 32. Shaft 36 extends through an electrical insulating fluid-tight coupling 39 to the exterior of the housing. Shaft 36 is therein driven by a motor 40 mounted on the external end of the shaft. Thus, movement of the motor causes rotation of shaft 36 and concurrent rotation of electrode wheel 30.

The electrode wheel in its interior is formed with an electrical fluid-carrying pipe 42 having a fluid entry inlet 45 and a fluid exhaust 46 opening to the interior of shaft 36. The water cooling helix 42 is arranged with at least one full convolute 48 immediately adjacent to the periphery 50 of electrode wheel 30. Water is transmitted to and exited from helix 42 through a fluid or water intake manifold 51 mounted on shaft 36 externally of housing 15. This is accomplished through an input pipe 55 which is directed through manifold 51 into fluid communication through shaft 36 with the inlet 45 for helix 42. Exhaust is thence accomplished from the outlet or exhaust 46 of helix 42 through shaft 36, manifold 51 and thence out the exhaust pipe 56.

The water or other fluid supply system for handling the entry and the exhaust at conduits 55 and 56 as well as motor 40 is maintained in electrical isolation from housing 15.

A source of high energy electrical power is provided at electrical terminal 60 and is connected by a coupling 61 to shaft 36 for transfer of the electrical energy directly to the conductive body of electrode wheel 30. The opposite pole of the aforesaid electrical energy is connected by ground 62 to cylinder 19 thereby establishing a grounded polarity at melt 26. This obviously establishes a high energy potential difference between the electrode wheel 30 and crucible 20.

Materials to be melted can be fed into melt 26 by conventional means. One illustration of such is shown in FIG.

1 in which a chute 70 is fed materials through an airlock mechanism 71. The termination of the chute is arranged to drop work material shown at 73 into crucible 20.

In operation, work material 73 is fed into crucible 20 through the airlock valve 71. Pump 16 is actuated to maintain the interior of housing 15 at an appropriate vacuum. Motor 40 is energized to rotate electrode wheel 30 at an appropriate speed. Electrical energy is applied at terminal 60 and at ground 62 at sufficient intensity to cause an arc 75 to be developed from the tangential edge of electrode wheel 30 to the top or upper surface 25 of melt 26. The arc, of course, raises the thermal gradint sufficiently to cause the particle 73 to form the molten bath or melt 26. Rotation of the electrode wheel 30 continually changes the area of the wheel from which arc 75 emanates. Thus, while the arc is being formed from only a few degrees of the periphery 50 of electrode wheel 30, the entire periphery 50 is being cooled by the water flow through helix 42. This causes a large area for heat dissipation and a small area for arc 75 formation. The contour shape of the electrode wheel 30 and the spacing between the top surface 25 of melt 26 are determined by conventional arc furnace teachings. As the heating of melt 26 continues and the material is purified by the early evaporation of impurities and their subsequent exhaust from housing 15 the crucible 20 is thence lowered and additional material 73 is fed to the melt 26. Crucible 20 is lowered in a manner to maintain the upper surface 25 in appropriately spaced arc forming relationship to the bottom of electrode wheel 30, thus insuring a constant arc forming spacing between the electrode members.

While the subject invention is shown in combination in a furnace application for purifying and molding granular materials, it is to be understood that the electrode wheel 30 can be used with other types of furnace applications which are known in the art.

In FIG. 3, there is another embodiment of the invention depicted in which a cylinder 80 similar to cylinder 19 is provided with a crucible 82 carrying a melt 83. An electrode wheel 85 is arranged in a similar angular displacement from horizontal so that the depending corner edge 88 of the wheel is at the closest position to the upper surface 89 of melt 83. The electrode wheel 85 is rotated by a motor 86 so that the exposed surface corner 88 is continually changing in exposure to the melting upper surface 89. In this embodiment, water flow is provided to cool electrode wheel 85 and electrical energy of one polarity is connected to the wheel. Electrical energy of the opposite polarity is connected to melt 83 to form the requisite arc 90 between the lower corner 88 and the upper surface 89 of melt 83. Because of the angular displacement of electrode wheel 85 from horizontal, the arc forming contact occurs at both sides of corner 88. Due to the rotation of the wheel the entire periphery of the wheel sequentially forms the arc forming area thus affording the advantage of a large surface heat dissipating function with a small arc forming area. Materials can be added to melt 83 through chute mechanism 92 similar to that shown at 70 in FIG. 1.

In FIG. 4 there is still another embodiment of the invention in which an electrode wheel 100 is mounted at approximately 45° to the top surface 101 of melt 102. Electrode wheel 100 is rotated by an appropriate mechanism on its shaft 105 in a direction indicated by arrow 107. With electrode wheel 100 being diagonally mounted on shaft 105 the bottom portion 108 of the wheel will appear to transverse the melt as indicated by arrow 109. Thus, the bottom portion of the wheel with its rotation will scan the top surface 101 of melt 102 as it is rotated. This causes a scan path of the arc 110 formed between the bottom portion 108 and melt 102 via the connection of appropriate electrical energy therebetween. Electrode wheel 100 is cooled in a manner similar to that described in reference to FIGS. 1 and 2. Thus, in the embodiment of FIG. 4, the bottom surface area 108 is similarly being moved during rotation of electrode wheel 100 and a scan path 109 is created to scan the heat transfer across the surface area of melt 102. This has advantages in reducing hot spots at the melt and forming a more even heat distribution.

While one embodiment of this invention has been shown and described, it will be apparent that other adaptations and modifications can be made without departing from the true spirit and scope of the invention.

What is claimed is:

1. In a melting and casting arc furnace of the type having an enclosed housing forming a controlled ambient atmosphere, a crucible mounted in said housing in which conductive, meltable material is to be melted, the improvement comprising: a wheel having a circular conductive arc-generating face, means rotatably mounting said wheel within said housing on an axis to position successive portions of the arc-generating face of said wheel to scan the top of the crucible upon rotation of said wheel about its rotational axis and maintain the successive portions of the arc-generating face in closely spaced arc-generating proximity to the top of the crucible, means establishing electrical current to the arc-generating face of said wheel and the conductive, meltable material in said crucible to establish an arc between the wheel and the conductive material in the crucible of sufficient intensity to melt and liquify the conductive material, and means rotating said wheel during application of electrical current to successively change the portion of the arc-generating proximity with the conductive material in the crucible.

2. In a melting and casting arc furnace according to claim 1 and wherein said means mounting said wheel is positioned to rotate said wheel on a horizontal axis vertically over said crucible and wherein said circular conductive arc-generating face comprises the peripheral edge of said wheel.

3. In a melting and casting arc furnace according to claim 1 and wherein said means mounting said wheel is positioned to rotate said wheel on a substantially horizontal plane on an axis from said crucible to position a portion of the lower face of said wheel electrode to overlie the crucible and wherein said circular conductive arc-generating face comprises a bottom portion of said wheel.

4. In a melting and casting arc furnace according to claim 1 and wherein said means mounting said wheel electrode is positioned to rotate said wheel about a horizontal axis in which the wheel is skewed at an angle relative to said axis and wherein said circular conductive arc-generating face comprises a peripheral edge of said wheel, the angle off of vertical mounting of said wheel being limited to an angle which will maintain the horizontal excursion of the bottom portion of the wheel within the inner limits of said crucible.

5. In a melting and casting arc furnace according to claim 1 and wherein feed means are provided adjacent said crucible for feeding conductive meltable material into said crucible and means for lowering the bottom of said crucible to maintain the top surface of the meltable conductive material in the crucible at a constant elevation to thereby maintain the top level of the conductive meltable material in the crucible in arc-generating proximity with the arc-generating face of the wheel.

6. In a melting and casting arc furnace according to claim 1 and having a pair of fluid conduits positioned to enter and exit fluid from said electrode wheel during rotation, a third fluid conduit mounted in said wheel connected to said two fluid conduits in internal proximity to said arc-generating face and means supplying cooling fluid into one of said two conduits and from the other of said two fluid conduits to cause continual circulation of coolant fluid through said third fluid conduit.

7. In a melting and casting arc furnace of the type having an enclosed housing forming a controlled ambient atmosphere, a crucible mounted in said housing in which conductive, meltable material is to be melted, the improvement comprising: a wheel having a circular conductive arc-generating face, a shaft having a portion extending externally of said housing, means rotatably mounting said shaft in atmosphere sealing condition at the juncture between said shaft and said housing, means rotating said shaft, said wheel mounted on the portion of said shaft internally of said housing, said shaft positioned to rotate said wheel on an axis to position successive portions of the arc-generating face of said wheel to scan the top of the crucible upon rotation of said wheel about its rotational axis and maintain the successive portions of the arc-generating face in closely spaced arc-generating proximity to the top of the crucible, means establishing electrical current to the arc-generating face of said wheel and the conductive, meltable material in said crucible to stablish an arc between the wheel and the conductive material in the crucible of sufficient intensity to melt and liquify the conductive material, and means rotating said wheel during application of electrical current to successively change the portion of the arc-generating face of the wheel which is in arc-generating proximity with the conductive material in the crucible.

8. In a melting and casting arc furnace of the type having an enclosed housing forming a controlled ambient atmosphere, a crucible mounted in said housing in which conductive meltable material is to be melted, the improvement comprising: a conductive electrode wheel, a shaft fixedly mounted to said wheel, means pivotally mounting said shaft for rotation of said wheel about a fixed axis within said housing, fluid conduit means carried interiorly of said wheel and said shaft, means circulating cooling fluid in said conduit means during rotation of said wheel, said crucible being positioned adjacent to an edge portion of said wheel within said housing in spaced relation therefrom, means supplying conductive meltable material to said crucible, means maintaining said meltable conductive material in said crucible at a fixed elevation relative to the closest peripheral portion to said wheel, means electrically energizing the meltable conductive material within said crucible and said wheel with opposite electrical potential to cause an arc to be developed therebetween.

9. In a melting and casting arc furnace of the type having an enclosed housing forming a controlled ambient atmosphere, a crucible mounted in said housing in which conductive meltable material is to be melted, the improvement comprising: a nonconsumable electrode wheel, means electrically energizing said wheel and the conductive meltable material in said crucible, said wheel having an arc-forming surface extending around a diameter of said wheel, means continuously shifting the position of the arc-generating face relative to the conductive meltable material by rotating said wheel to constantly change the area of arc generation from said wheel while maintaining the spatial distance between the arc-forming area of the wheel and the conductive meltable material constant, and means mounted within said electrode to cool the entire wheel surface.

References Cited

UNITED STATES PATENTS

| | | | |
|---|---|---|---|
| 1,217,431 | 2/1917 | Foley | 219—69 X |
| 2,007,225 | 7/1935 | Strobel | 219—69 |
| 2,015,415 | 9/1935 | Steiner | 219—69 |
| 2,355,838 | 8/1944 | Young et al. | 219—69 |
| 2,815,435 | 12/1957 | Adcock | 219—69 |

BERNARD A. GILHEANY, *Primary Examiner.*

H. B. GILSON, *Assistant Examiner.*

U.S. Cl. X.R.

13—9, 31; 219—69